United States Patent
Adolph et al.

(10) Patent No.: US 7,715,685 B2
(45) Date of Patent: May 11, 2010

(54) RECORDING MEDIA MAINTENANCE SUPPORT

(75) Inventors: Dirk Adolph, Ronnenberg (DE); Stefan Kubsch, Hohnhorst (DE); Marco Winter, Hannover (DE); Meinolf Blawat, Hannover (DE); Hui Li, Hannover (DE); Harald Schiller, Hannover (DE); Wolfgang Klausberger, Hannover (DE); Ralf Ostermann, Hannover (DE); Axel Kochale, Springe (DE); Hartmut Peters, Barsinghausen (DE); Uwe Janssen, Seelze (DE); Jobst Hörentrup, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 1176 days.

(21) Appl. No.: 10/402,306

(22) Filed: Mar. 28, 2003

(65) Prior Publication Data

US 2003/0206713 A1 Nov. 6, 2003

(30) Foreign Application Priority Data

Apr. 22, 2002 (EP) .................................. 02008969

(51) Int. Cl.
*H04N 5/93* (2006.01)
(52) U.S. Cl. ........................... 386/52; 386/124; 386/93; 386/88
(58) Field of Classification Search .................. 386/95, 386/125–126, 46, 98, 52, 88, 93, 124
See application file for complete search history.

(56) References Cited

U.S. PATENT DOCUMENTS

| | | | |
|---|---|---|---|
| 6,360,057 B1 * | 3/2002 | Tsumagari et al. ............ | 386/95 |
| 6,515,950 B1 * | 2/2003 | Tanikawa et al. .......... | 369/53.24 |
| 7,334,090 B2 * | 2/2008 | Zellner ....................... | 711/154 |
| 2002/0127000 A1 * | 9/2002 | Yamato et al. .............. | 386/109 |
| 2002/0146234 A1 * | 10/2002 | Mizuno ....................... | 386/46 |
| 2002/0152267 A1 * | 10/2002 | Lennon ...................... | 709/203 |
| 2006/0130097 A1 * | 6/2006 | Lee et al. ...................... | 725/50 |

FOREIGN PATENT DOCUMENTS

| | | |
|---|---|---|
| EP | 1091358 | 4/2001 |
| EP | 1107588 | 6/2001 |
| EP | 1143720 | 10/2001 |
| EP | 1191461 A1 | 3/2002 |

(Continued)

OTHER PUBLICATIONS

Patent Abstracts of Japan, vol. 2000, No. 22, Mar. 9, 2001 & Jp 2001 148155.

(Continued)

*Primary Examiner*—Thai Tran
*Assistant Examiner*—Helen Shibru
(74) *Attorney, Agent, or Firm*—Robert D. Shedd; Joseph J. Opalach; Reitseng Lin

(57) ABSTRACT

The handling of large amounts of data on storing media shall be simplified. Therefore, a method for maintaining a storage media by generating, editing or reading log data related to the content and usage of a data item stored or to be stored on a storage medium is provided. Data items are deleted or recommendations for deletion are provided on the basis of the log data from the storage medium. Thus, the user is relieved from the unpleasant and time-consuming task of deleting data items from recording media.

18 Claims, 1 Drawing Sheet

FOREIGN PATENT DOCUMENTS

| | | |
|---|---|---|
| EP | 1195768 | 4/2002 |
| JP | 749803 | 2/1995 |
| JP | 9034755 | 2/1997 |
| JP | 2000339200 | 5/1999 |
| KR | 2002-0008206 A | 1/2002 |
| WO | 0005718 | 2/2000 |

OTHER PUBLICATIONS

Search Report for European Appln. No. 02008969 dated Sep. 24, 2002.

* cited by examiner

RECORDING MEDIA MAINTENANCE SUPPORT

FIELD OF THE INVENTION

The present invention relates to a method for maintaining storage media including the step of generating, editing or reading log data related to the content and/or usage of a data item stored or to be stored on a storage medium. Furthermore, the present invention relates to a device for recording data items on a storage medium.

BACKGROUND OF THE INVENTION

The increase of media capacities for DVD (Digital Versatile Disk) and DVR (Disk for Digital Video Recording) provides new dimensions for the private recording. While in the past only two or three movies could be stored on a single recording medium like a VHS tape for example, in the future it will be possible to store much more movies on the larger volume capacities, e.g. 40 movies a disc. Another change is enforced by the fact that the storage medium for recording is a digital one and therefore different application contents like photo, audio, e-books and movies will be stored on the same single medium.

The handling of such a data amount is not easy for the user. In fact metadata (data about data) will be added to navigate within and to select the desired items, but there is no solution for the maintenance of data. What will happen when the medium becomes full and therefore a record task request cannot be executed? The user will have to delete some other data. This is a very unpleasant and also time-consuming task.

The reason for this is that the deleting of recorded material on a DVD or DVR has to be done manually. The user has to determine and explicitly select those date to be deleted.

SUMMARY OF THE INVENTION

It is an object of the present invention to provide a device and method for maintaining a storage media in a more comfortable way.

According to the present invention this object is solved by a method for maintaining storage media including the steps of generating, editing or reading log data related to the content and/or usage of a data item stored or to be stored on a storage medium and deleting completely and automatically at least a part of said data item or providing a recommendation for deletion on the basis of said log data from said storage medium.

Furthermore, the above object is solved by a device for recording data items on a storage medium with log data means for generating, editing or reading log data related to the content/or usage of a data item stored or to be stored on a storage medium and deleting means or deleting completely and automatically at least a part of said data item or providing a recommendation for deletion on the basis of said log data from said storage medium.

Further favourable developments of the inventive method and inventive device are defined in the subclaims.

In other words, the present invention provides a method and a device for managing a deleting process. The management of deleting can be improved in two ways: during an interactive process of supporting the users deleting decision with recommendations or automatically in a background process when the medium space runs short.

An advantage of the present invention is that metadata may be generated on the recorder describing the usage of the essence (recordings). Hereby the word "essence" includes data like audio and video data, whereas metadata represent data related to the essence as additional date like links or, here, usage and deletion information. The metadata can, for example, be stored on the media comprising the essence the metadata is related to, or in the recorder itself. Based upon an analysis of the previously generated usage log metadata, it becomes possible to select recordings for deletion. In one solution the recorder can do the selection and deletion of essence automatically when storage space runs short. This will relieve the user from the deleting task.

Additionally it becomes possible to provide machine-generated recommendations for the user when he explicitly starts a deleting process. These machine-generated recommendations for deletion may be accepted by the user or declined partly or at a whole and depending on this decision a potentially complex deletion process can be executed in one machine task without further user action.

BRIEF DESCRIPTION OF THE DRAWING

The present invention will now be described in more detail in connection with the attached drawing showing a flow chart for a maintenance profile generation.

DETAILED DESCRIPTION OF EXEMPLARY EMBODIMENTS

Figure 1:
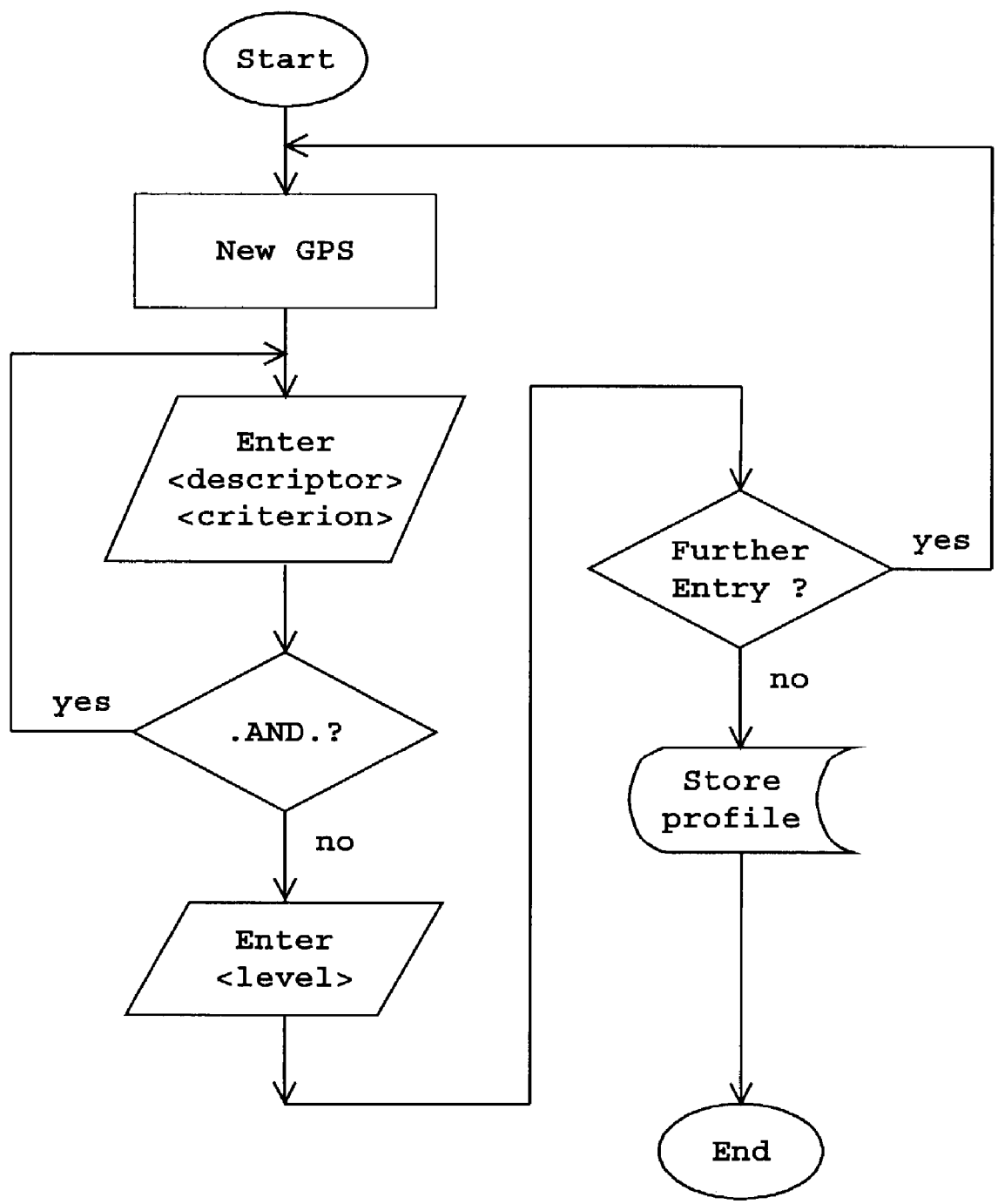

According to a preferred embodiment of the present invention, prerequisite for providing a media maintenance to the user is the generation of means for a later analysis.

This means are called Item Usage Logs (IUL; see Table 1). Every action initiated by the user and processed by the recorder will generate a new IUL or update an IUL. For example if the recorder is recording a new item or if an already recorded item is played back or if it is changed by editing, every time a IUL is generated or updated. All the Item Usage Logs are accumulated in a list available for every item.

The left column of table 1 shows the elements contained in every IUL. The element <action> logs the executed command, the user who executed it is included within <user>, the <date&time> stores time and date of execution, and if a stream is handled the part of the stream acted on is logged by <start> and <end>. The element <protection> represents a value for controlling the deletion process and is set to a default value from the recorder or to a specific one by the user directly (protection change) or by any action executed, e.g. if the item is played back from the user then it is marked to be deleted first by setting <protection> to 1.

TABLE 1

Exaplanation to Item Usage Log (IUL)

| Element | Explanation/Example |
| --- | --- |
| <class> | Item identification for video, audio, metadata,. . . |
| <user> | User ID executing action |
| <protection> | Level 1 till k; 1 is the lowest protection |
| <action> | Record, playback, editing, protection,. annotation, |
| <date&time> | Of last action |
| <start> for Streaming data | Stream entry position |
| <end> for Streaming data | Stream exit position |

By using previously generated IULs it becomes possible to give maintenance support to the user. Here follows a list of possibilities considering user recommendations or automatically executed processes, which may be realised in specific embodiments:

1. When a user is playing back the same item for a second time the recorder can pop up a question after the playback and ask the user if this item should be treated individually by setting a higher protection level else set the item to be deleted first by setting the value to the lowest protection level.
2. Depending on the item <class> an application specific protection level can be selected, e.g. highest level for the recordings of private photos.
3. If an annotation is added to an item, i.e. when metadata or other items are linked to the item then increase the protection or pop up a question and ask the user for selecting the protection.

When the storage space on the medium runs short:

4. For each item determine the count of uses. This is done for a selection criterion for automatic deletion.
5. Delete those items having the lowest protection and not being used for a time longer than N, where N can be a default or a user selected value.
6. Delete those items having the lowest protection and having already been played back.

A much more powerful media maintenance support for the user becomes possible by applying a more complex algorithm to the IULs. The basics of this algorithm are disclosed within the following.

To provide the advanced media maintenance support a list of rules, here called Global Protection Settings (see Table 2) is generated. Every Global Protection Setting (GPS) is globally available in a system and consists of three entries. The <descriptor> can be taken from the IUL elements or other metadata belonging to the item recorded such as genre, author, summary, type, etc. Associated to each <descriptor> a <criterion> is defined containing a logical rule, which is describing the GPS selection criterion. The third entry is called <level> and holds the resulting protection value when having applied the GPS.

Table 2 shows some GPS examples. The first GPS example says: when recording a new item set the protection level to "high", which is the highest value possible for the protection element in the IUL (i.e. <protection>=k). The third example in Table 2 determines that an item having an associated metadata actor "Clint Eastwood" should be set to protection level "medium". This is equivalent to <protection>=k/2. In row five of Table 2 there is an example, which could be examined automatically by the recorder when the storage runs short to determine an item and delete it. When the difference between the actual date and the metadata recording date is greater than two weeks for an item set protection level to "low". This would be <protection>=1 and the item would be deleted.

TABLE 2

Examples for Global Protection Settings

| <descriptor> | <criterion> | <level> |
| --- | --- | --- |
| iul.action | .eq. Record | "high" |
| iul.action | .eq. playback | "low" |
| actor | .eq. "Clint Eastwood" | "medium" |
| summary | contains "history" | "high" |
| recording date | .lt. "current - 2 weeks" | "low" |
| title | .eq. "Tagesschau" | "high" |
| production date | .lt. "1970" | "high" |

The GPSs are used to set up a maintenance profile for one or more recording media. The profile may be stored in the recorder for plural recording media or on each recording medium individually. An algorithm for the maintenance profile generation is depicted in FIG. 1. A new GPS is generated in step 1. The values of the GPS have to be entered in the following steps. In step 2 the descriptor and the criterion is entered. In step 3 it has to be decided whether several descriptors and criteria have to be combined. If the decision is "yes" two or more descriptors and criteria are linked by the logical operator "and". After combining several descriptors and criteria the level of the protection level indicator has to be entered in step 4. In step 5 it has to be decided whether a further GPS has to be input into the maintenance profile. If the decision is "yes", the process returns to step 1. If the decision is "no", the process proceeds further to step 6, where the profile is stored in the recorder or on the recording medium.

As can be seen from the flow chart an accumulation of different descriptors and criteria is possible for a single GPS rule. This is a very powerful tool and allows defining replacement recordings for instance for which the following example is given. If one wants to keep the most actual version of a specific news program for two weeks and to delete all older versions one needs a combined GPS. This can be provided by the combination of row five and row six in Table 2. The level of this combined GPS would be "low" to give rise to the deletion. If it comes true that more than one GPS must be applied to a single item the GPS processing order, for example the order 1 to 7 of table 2, will determine the final result of the level for this item. Alternatively, the level of a combined GPS rule may be calculated form the levels of the plural GPSs which are combined. The level for the combined GPS may be calculated to the medium of the GPSs concerned.

By using the GPSs it becomes possible to give maintenance support to the user. Here follows another list of possibilities considering user recommendations or automatically executed processes:

7. The recorder can use already available metadata for maintenance.
8. The recorder can create its own metadata (e.g. IUL) for maintenance purposes.
9. The recorder can generate an independent maintenance profile for each medium. For example every DVR disc has its own maintenance profile.
10. The user can specify the highest protection level by defining k for each medium.
11. The user can specify protection levels depending on the <class> for each item. This can be used for example to keep all photos but to delete all videos first when necessary due to storage shortage.
12. By using combinations of GPSs the user can set up complex maintenance tasks automatically executed by the recorder, e.g. automatic replace recordings.

Thus, the present invention provides an improved user interface, which becomes important when a recording medium is holding a huge amount of different application items. The maintenance of all these data is not left up to the user, who would have to get rid of obsolete items by deleting everything by hand. For this purpose metadata are created and deposited for example on a storage medium. Such metadata can be exported, for example in the XML format and further used for user supporting interface techniques, automated substitution, deleting, proposing for protection etc.

With the inventive system the rules for deletion are adaptable to user preferences. Since, furthermore, the data items may be deleted completely, most maintenance work can be done automatically.

The present method is applicable to all storage media containing more than one item. That could be for example a hard disk, a tape, any RAM, etc. Prerequisite is the generation of the Usage Log or another log data unit for every item.

What is claimed is:

1. A method for maintaining storage media, said method comprising the steps of:
   generating, editing or reading log data related to metadata describing content of a data item stored or to be stored on a storage medium;
   generating, editing or reading log data related to metadata describing usage of said data item;
   determining a first protection level for said data item defined by a first protection setting related to said metadata describing said content of said data item, said first protection stetting being customizable by a user;
   determining a second protection level for said data item defined by a second protection setting related to said metadata describing said usage of said data item;
   calculating a combined protection level for said data item from said first protection level and said second protection level; and
   deleting completely and automatically at least a part of said data item or providing a recommendation for deletion based on said combined protection level.

2. The method according to claim 1, wherein said deleting or providing of said recommendation is performed in response to storage space on said storage medium reaching a predetermined level.

3. The method according to claim 1, wherein said combined protection level is set according to a combination of rules being used in a predetermined order.

4. The method according to claim 3, further including the step of creating or editing said rules.

5. The method according to claim 3, wherein said rules include a descriptor for the data item forming the basis of the decision, a criterion for the decision and the combined protection level as a result of the decision.

6. The method according to claim 3, further including the step of storing at least one of said log data and said rules on at least one of said storage medium and a data processing system.

7. The method according to claim 1, wherein the log data includes at least one of class, user, usage, time and streaming information.

8. The method according to claim 7, wherein the class information includes an item identification for at least one of video data, audio data and metadata.

9. The method according to claim 7, wherein the time information includes a date and time of a last usage of said data item.

10. The method according to claim 7, wherein the streaming information includes a stream entry position and a stream exit position.

11. A device for recording data items on a storage medium, said device comprising:
    log data means for at least one of generating, editing and reading log data related to metadata describing content of a data item stored or to be stored on a storage medium;
    said log data means further at least one of generating, editing and reading log data related to metadata describing usage of said data item;
    determining means for determining a first protection level for said data item defined by a first protection setting related to said metadata describing said content of said data item, said first protection setting being customizable by a user;
    said determining means further determining a second protection level for said data item defined by a second protection setting related to said metadata describing said usage of said data item;
    calculating means for calculating a combined protection level for said data item from said first protection level and said second protection level; and
    deleting means for deleting completely and automatically at least a part of said data item or providing a recommendation for deletion based on said combined protection level.

12. The device according to claim 11, wherein said deleting or providing of said recommendation is performed in response to storage space on said storage medium reaching a predetermined level.

13. The device according to claim 11, wherein said combined protection level is set according to a combination of rules being used in a predetermined order.

14. The device according to claim 13, wherein said rules include a descriptor for the data item forming the basis of the decision, a criterion for the decision and the combined protection level as a result of the decision.

15. The device according to claim 11, wherein the log data includes at least one of class, user, usage, time and streaming information.

16. The device according to claim 15, wherein the class information includes an item identification for at least one of video data, audio data and metadata.

17. The device according to claim 15, wherein the time information includes a date and time of a last usage of said data item.

18. The device according to claim 15, wherein the streaming information includes a stream entry position and a stream exit position.

* * * * *